Patented May 26, 1942

2,284,065

UNITED STATES PATENT OFFICE 2,284,065

PLASTICIZED WAXES

Robert J. Myers, Elkins Park, Pa., assignor to The Resinous Products & Chemical Company, Philadelphia, Pa.

No Drawing. Application November 16, 1939, Serial No. 304,699

7 Claims. (Cl. 106—270)

This invention relates to plasticized waxes. In particular it deals with the plasticizing of wax with a metal salt of a substituted aryloxy aliphatic carboxylic acid.

It has been found that the usual brittleness of waxes can be overcome by the addition thereto of even small amounts of a metal salt of certain hydrocarbon-substituted aryloxy aliphatic carboxylic acids. Such an addition may be made by dissolving the metal salt in a melted wax or by dissolving the metal salt in a solution of a wax and evaporating the solvent. The treated wax loses its crystalline character to a marked extent, becomes more flexible, and acquires increased adherence to the surfaces to which it may be applied. The wax is definitely plasticized rather than merely softened. In general the melting point of the wax is not changed by addition of a metal salt of an aryloxy carboxylic acid.

Waxes, including in this term the natural waxes, so-called synthetic waxes, and paraffin waxes, are all susceptible to the described action of the metal salts. There may be used beeswax, Japan wax, candelilla wax, montan wax, etc., mixtures of waxes, waxes prepared by esterification of high fatty acids, such as montanic acid, with glycerine, glycol, or monohydric alcohol, waxes prepared from the reaction of higher alcohols and fatty acids, waxes prepared by hydrogenation of oils, such as castor oil, waxes of various melting points obtained from petroleum, etc.

The metal salts which are effective include the organic solvent-soluble salts of acids of the general type

R—O—C$_n$H$_{2n}$—COOH wherein R is an aryl nucleus, hydrocarbon-substituted with at least five carbon atoms, of which at least four must be in the same group, n represents a whole number less than six. The group represented by C$_n$H$_{2n}$ in the above formula is preferably —CH$_2$— or —CH$_2$.CH$_2$—, but it may also be a larger group as found in

—CH(CH$_3$)CH$_2$— as in cyclohexylphenyloxyisobutyric acid or such a group as occurs in sec.amylphenyloxyvaleric acid. The aryl group may be phenyl, naphthyl, or other aryl group and may be substituted with one or more hydrocarbon substituents, such as amyl, hexyl, cyclohexyl, phenyl, α,α,γ,γ-tetramethylbutyl, n-octyl, undecenyl, dodecyl, cetyl, oleyl, naphthenyl, bornyl, etc. as found in such acids as sec-hexylphenoxyacetic or sec-amylnaphthyloxyacetic or polysubstituted aryl groups, like isobutylmethyl-, amylmethyl-, diamyl-/phenyl, etc. Not all metal salts are soluble in all waxes but in general the aluminum, magnesium, calcium, manganese, cobalt, zinc, lead and iron salts, etc., which may be classified as wax-soluble salts of polyvalent metals, are of greatest interest. In general, there may be used for plasticizing waxes any metal salt of these acids which is soluble in a wax up to a temperature of 150° C. It is also possible to dissolve monovalent salts, such as the sodium and potassium salts, in waxes although the use of the monovalent metal salts may be undesirable in many applications, as they are also water-soluble and may render waxes less water-resistant. A ratio of one part or more of a metal salt of an aryloxy aliphatic carboxylic acid in 20 parts of a wax shows a definite effect on the properties of the wax.

These metal salts not only plasticize waxes but also increase the compatibility of one wax with another and of waxes with other materials, such as resins, metallic soaps, etc. For example, aluminum stearate may be used along with an aluminum aryloxyacetate and be dispersed or dissolved in a wax. This combination is of particular interest with paraffin waxes as the water-repellency of the resulting mixture can be made very high and at the same time solutions containing the three materials are rendered fluid. The presence of the aluminum aryloxyactate permits much larger amounts of aluminum stearate, for example, to be used than otherwise. Films from this combination are clearer and more adherent than the films formed upon the addition of only a metallic soap to a wax. The influence of the salt of the aryloxy aliphatic carboxylic acid is so marked that up to four or five parts of aluminum stearate may be used for every part of said salt.

The effect on various typical waxes is shown in the following examples:

Example 1

One part of aluminum caprylphenoxyacetate was melted with five parts of yellow beeswax to give a homogeneous melt. This was poured in thin layers onto plates and allowed to harden. The films formed in this way possessed excellent flexibility, adhesion and cohesion.

Magnesium caprylphenoxyacetate was used in place of the aluminum salt with entirely comparable results.

A third preparation with beeswax was prepared by melting one-half part of aluminum caprylphenoxyacetate and one-half part of a commercial aluminum stearate in five parts of beeswax. The films from this preparation were tough, possessing excellent flexibility and adhesion.

Example 2

There were melted together 84 parts of Japan wax, 8 parts of aluminum stearate, and 8 parts of aluminum caprylphenoxyacetate. The films formed from this mixture were more adhesive and more flexible than from the unplasticized wax.

Plasticization of 84 parts of Japan wax with 16 parts of magnesium caprylphenoxyacetate was even more effective than the mixed aluminum salts above, yet at the concentration used the solubility of the magnesium salt in the wax had definitely been exceeded, as shown by precipitation on cooling.

*Example 3*

One part of aluminum α,α,γ,γ-tetramethylbutylphenoxyacetate was dissolved by melting in five parts of candelilla wax. The films formed from this mixture were excellent in adhesion and definitely tougher and harden than the unplasticized wax.

A melt prepared from one-half part of the above aluminum salt, one-half part of aluminum stearate, and five parts of candelilla wax was similarly excellent in adhesion, toughness and flexibility although, perhaps, not quite so hard.

*Example 4*

A grade of paraffin referred to as microcrystalline was was used for the preparation of various melts containing five parts of wax to one part of aluminum caprylphenoxyacetate, five parts to one part of aluminum dodecylphenoxyacetate, five parts to one part of aluminum diamylphenoxyacetate, and five parts to a mixture containing one-half part of aluminum stearate and one-half part of aluminum caprylphenoxyacetate. All of these preparations gave films of excellent flexibility and adhesion and of improved film strength.

*Example 5*

A brittle paraffin wax, which melted at 120° F., was plasticized with one part of aluminum caprylphenoxyacetate for each 10 parts of wax. Films were clear and possessed good flexibility and adhesion. Paper coated with the molten mixture held the coating well, did not crack and peel like coatings from unplasticized wax, and were free from the usual extreme brittleness in the cold.

One part of the zinc salt of caprylphenoxyacetic acid was dissolved by melting with 6.5 parts of the brittle paraffin wax. Films from this mixture were clear, flexible and adhesive. Good results were similarly obtained by melting one part of magnesium caprylphenoxyacetate in ten parts of wax. A paraffin wax plasticized with magnesium caprylphenoxyacetate will take up two or more parts of aluminum stearate without gelling or acquiring properties which interfere with application of the melt. The capacity of such salts to overcome the gelling action of metallic soaps in organic solvents is shown in application Serial No. 304,700, filed November 16, 1939. For many applications the combination of a salt of an aryloxy aliphatic carboxylic acid and a metallic soap in a wax is highly effective and economical.

*Example 6*

Five parts of paraffin and one part of aluminum ter-amylphenyloxyisobutyrate were melted together. Films formed from this composition were adherent and flexible. Paper, dipped in the molten mixture, drained, and cooled, was free from the cracking and peeling encountered with unplasticized paraffin coatings.

*Example 7*

Four parts of paraffin and one part of aluminum dodecylphenoxyacetate were dissolved in 100 parts of toluene. The solution was found useful for water-proofing heavy tarpaulins, stucco, etc., leaving a tough, adherent, flexible film, which did not become brittle when chilled.

Waxes, as is well known, usually possess a crystalline-like structure in contrast to the amorphous character of resins. Waxes tend to be hard and brittle, particularly in the cold. As temperatures are lowered, they become more brittle, less cohesive, less adhesive. The addition of a wax-soluble salt of an aryloxy aliphatic carboxylic acid makes the waxes less crystalline, improves adhesion and film strength, and makes the waxes less affected by the lowering of temperature.

The waxes having a salt of an aryloxy aliphatic carboxylic acid dissolved therein possess properties which are of value in coating paper, impregnating fabrics, treating building materials, etc. for finishing, water-proofing, etc. The modified waxes may be applied as hot melt coatings, in solvent solutions, or in emulsions, or the plasticized waxes may be incorporated with other materials.

I claim:

1. A composition of matter comprising a wax having dispersed therein a polyvalent metal salt of an acid having the formula $$R\text{---}O\text{---}C_nH_{2n}\text{---}COOH$$

wherein R is an aryl group, hydrocarbon-substituted with at least five carbon atoms, at least four of which are in the same substituent group, and $n$ is a whole number less than six, said salt being soluble in said wax.

2. A composition of matter comprising twenty parts of a wax having dispersed therein at least one part of a polyvalent metal salt of an acid having the formula $$R\text{---}O\text{---}CH_2\text{---}COOH$$

wherein R is an aryl group, hydrocarbon-substituted with at least five carbon atoms, at least four of which are in the same substituent group, said salt being soluble in said wax.

3. Wax having dissolved therein a metallic soap and a polyvalent metal salt of an acid having the formula $$R\text{---}O\text{---}C_nH_{2n}\text{---}COOH$$

wherein R is an aryl group, hydrocarbon-substituted with at least five carbon atoms, at least four of which are in the same substituent group, and $n$ is a whole number less than six.

4. Paraffin wax having dissolved therein a polyvalent metal salt of an acid having the formula $$R\text{---}O\text{---}CH_2\text{---}COOH$$

wherein R is an aryl group, hydrocarbon-substituted with at least five carbon atoms, at least four of which are in the same substituent group.

5. Paraffin wax having dissolved therein aluminum caprylphenoxyacetate.

6. Paraffin wax having dissolved therein aluminum stearate and a polyvalent metal salt of an acid having the formula $$R\text{---}O\text{---}CH_2\text{---}COOH$$

wherein R is an aryl group, hydrocarbon-substituted with at least five carbon atoms, at least four of which are in the same substituent group.

7. Paraffin wax having dissolved therein aluminum stearate and aluminum caprylphenoxyacetate.

ROBERT J. MYERS.